Jan. 16, 1968   C. M. SABIN   3,363,462
FLUID ANEMOMETER SYSTEM
Filed Sept. 30, 1964

INVENTOR.
CULLEN M. SABIN
BY
FULWIDER, PATTON, RIEBER, LEE & UTECHT
ATTORNEYS

United States Patent Office 3,363,462
Patented Jan. 16, 1968

3,363,462
FLUID ANEMOMETER SYSTEM
Cullen M. Sabin, 516 Glencrest Drive,
Solana Beach, Calif. 92075
Filed Sept. 30, 1964, Ser. No. 400,513
5 Claims. (Cl. 73—204)

ABSTRACT OF THE DISCLOSURE

A fluid anemometer which includes a linearizer means whose output is a linear function of fluid velocity. The system compensates for fluid temperature variations and is controlled by an amplifier which maintains the mean bridge voltage unbalance of zero.

---

The present invention relates to a fluid anemometer system and to the method for measuring the local velocity of a flowing fluid. A hot wire anemometer is a device used to determine the velocity of a flowing fluid. It utilizes an electrically heated probe resistor which is immersed in the flowing fluid and is maintained at substantially a constant temperature. The rate at which the immersed constant temperature probe resistor is cooled by the fluid is dependent on the velocity of the fluid. In order to maintain the probe resistor temperature constant as the velocity of the fluid changes, the voltage applied to the probe resistor must be changed. The magnitude of the voltage applied to the probe resistor is therefore related to the velocity of the fluid.

The fluid anemometer system and the method, aforementioned, of the present application comprises utilizing a probe resistor which is immersed in the fluid; control means is provided for applying a voltage across the probe resistor and for varying said voltage to maintain constant the temperature difference between the probe resistor and the fluid; and linearizer means is provided whose input voltage is a linear function of the controlled voltage across the probe resistor, the output voltage of said linearizer means being a linear function of the fluid velocity.

The principal features of the fluid anemometer system of the present application are that it may be used in liquids as well as gases; it is accurate at low fluid velocities; it has an output voltage which is a linear function of the fluid velocity; it has a stable probe resistor; and it compensates for fluid temperature changes.

Other features and the advantages of the present invention will be apparent from the following description, reference being made to the accompanying drawings wherein a preferred embodiment of the invention is illustrated.

Figure 1:
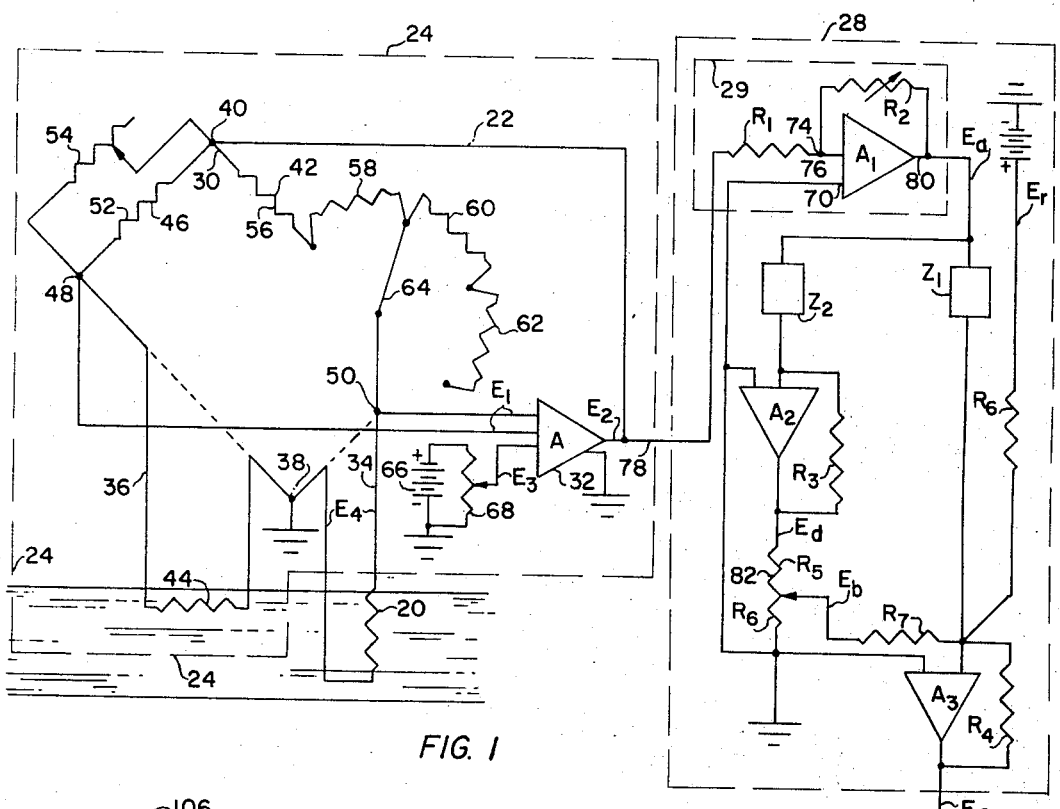
FIG. 1 is a circuit diagram of the fluid anemometer system.

The electrical circuit of the fluid anemometer system of the present application is illustrated in FIG. 1 and is principally comprised of probe resistor 20, control means (that portion of FIG. 1 which is enclosed by reference line 24) and linearizer means (that portion of FIG. 1 which is enclosed by reference line 28). The control means 24 comprises a portion of Wheatstone bridge 30 and amplifier means 32. Said portion of the Wheatstone bridge includes all of said bridge except probe resistor 20.

Wheatstone bridge 30 comprises two parallel paths, namely, probe path 34 and reference path 36. Paths 34 and 36 join at two primary junctions 38 and 40. Each path comprises two primary resistors connected in series. In the probe path 34, the primary resistors are the probe resistor 20 and incremental resistor 42. In reference path 36, the primary resistors are the reference resistor 44 and variable resistor 46. Secondary junctures 48 and 50 exist between incremental resistor 46 and reference resistor 44 and between incremental resistor 42 and probe resistor 20, respectively.

The reference resistor 44 and the probe resistor 20 are immersed in the fluid and are made of the same noble metal so that they are corrosion resistant and their electrical resistances affected by temperature in the same manner. The incremental resistor 42 and the variable resistor 46 are made of material having a low temperature coefficient of resistivity, for example Manganin.

When a voltage is applied across the primary junctures 38 and 40, electric currents are set up in paths 34 and 36. This current passage causes electrical energy dissipation in the bridge resistors. A change in the voltage magnitude applied to the primary junctures 38 and 40 causes a change in the level of energy being dissipated by each resistor. The total resistance of reference path 36 is made to be much greater than the total resistance of probe path 34 (e.g. 30 times as great). Therefore, substantially all the energy dissipation takes place in probe path 34. This fact has two important ramifications: firstly, since very little energy is dissipated in reference path 36, reference resistor 44 and variable resistor 46 heat up very little regardless of the voltage applied to the primary junctures 38 and 40 ($E_2$) and consequently the resistance of reference path 36 is very little affected by changes in voltage $E_2$; secondly, since substantially all the energy dissipation occurs in probe path 34, incremental resistor 42 and probe resistor 20 heat up and consequently since incremental resistor 42 has a much lower temperature coefficient of resistivity than probe resistor 20, only the resistance of probe resistor 20 is substantially affected by changes in voltage $E_2$.

Variable resistor 46 comprises fixed resistor 52 and precision potentiometer 54 which are connected in parallel. Incremental resistor 42 comprises fixed resistor 56 and additive resistors 58, 60 and 62. Switch 64 is in path 34 and may be positioned such that path 34 may be electrically comprised of fixed resistor 56 or any of the following combinations of resistors in series, 56 and 58; 56, 58, and 60; and 56, 60, and 62.

The above described Wheatstone bridge 30 is operated in the following described manner. Switch 64 is positioned such that only fixed resistor 56 and probe resistor 20 are in path 34. A small value of voltage $E_2$ is applied across primary junctures 38 and 40. A small value of voltage $E_2$ is used so as to provent any substantial heating of probe resistor 20. The precision potentiometer 54 is adjusted until the voltage potential ($E_1$) between secondary junctures 48 and 50 is zero. When this condition of zero voltage potential exists, the Wheatstone bridge 30 is said to be balanced. One or more of the additive resistors 58, 60, and 62 is then added to path 34. This added resistance causes the Wheatstone bridge 30 to become unbalanced. To rebalance the bridge, the voltage $E_2$ is increased. This voltage increase causes probe resistor 20 to heat up and as a result to increase its resistance. The voltage $E_2$ is increased until the resistance of probe resistor 20 is high enough to rebalance the circuit. Thus when the bridge is rebalanced, a temperature difference is established between probe resistor 20 and the fluid. As long as the bridge is balanced, the temperature difference will remain constant. If the temperature of the fluid changes then the resistance of reference probe 44 will change and therefore unbalance the Wheatstone bridge 30. Control means 24, described below, will sense this unbalance and attempt to rebalance the bridge by changing the voltage $E_2$ so as to change the resistance of probe resistor 20. Because of the characteristics of Wheatstone bridges and the fact the probe resistor 20 and reference resistor 44 have the same temperature coefficient of resistivity and are both immersed in the fluid, the temperature difference between the fluid and probe resistor 20 will remain constant although the temperature changes in the fluid.

The purpose of control means 24 is to maintain a constant temperature difference between the fluid and probe resistor 20. Control means 24 comprises amplifier 32 and a portion of Wheatstone bridge 30. Said portion including all of Wheatstone bridge 30 except probe resistor 20.

The input voltage to amplifier 32 is the voltage potential ($E_1$) between secondary junctures 48 and 50. $E_1$ represents the voltage caused by unbalance in Wheatstone bridge 30. There must always be an output voltage $E_2$ in order for probe resistor 20 to maintain a resistance which will substantially balance Wheatstone bridge 30 (i.e. reduce $E_1$ to substantially zero). However, there must be an amplifier voltage input so that there will be an output voltage $E_2$. Therefore, though amplifier 32 attempts to reduce $E_2$ to zero, it can not quite do it. In order to enable amplifier 32 to reduce $E_2$ to zero (i.e. balance the bridge), offset voltage $E_3$ is supplied to the input side of amplifier 32. The magnitude of $E_3$ is increased until $E_1$ is reduced to zero. Voltage $E_3$ is supplied by battery 66 and its magnitude controlled by voltage divider 68.

The purpose of linearizer means 28 is to produce a voltage output $E_0$ which is a linear function of the velocity of the fluid.

To explain the operation of linearizer means 28, it is first necessary to discuss the functional relationship between the fluid velocity and the power dissipation of probe resistor 20. As previously stated, to maintain the temperature of probe resistor substantially constant as the velocity of the fluid changes, the voltage applied to probe resistor 20 must be changed to change the power dissipated by said resistor. Since the resistance of probe resistor 20 is maintained constant, its power dissipation is a function of the applied voltage squared ($E_4^2$). The required power dissipation (cooling rate) of probe resistor 20 is related to the heat transfer characteristics of probe resistor 20 in relation to a flowing fluid. For a cylindrical wire as well as many other configurations immersed in a flowing fluid the cooling rate (energy dissipation rate) is known to be related to a constant times the square root of the Reynolds number, plus a function of the Prandtl number. Therefore, if constant fluid properties are assumed, $E_4^2$ (power dissipation) may be related to fluid velocity, V, by an equation of the following form:

$$E_4^2 = C + D\sqrt{V}$$

Since a balanced Wheatstone bridge requires that $E_2$ be a linear function of $E_4$ the above equation may take the following form:

$$E_2^2 = A + B\sqrt{V}$$

This last equation may be inverted in the following manner:

$$B^2 V = E_2^4 - 2AE_2^2 + A^2$$

The purpose of linearizer means 28 is to cause its output voltage $E_0$ divided by a constant ($K_1$) equal to an expression of the same form as the right hand side of the last equation. When this is accomplished then $$E_0 = K_1 B^2 V$$

or in other words, since $K_1$ and B are constants, the output voltage $E_0$ is a linear function of the velocity of the fluid, V.

To explain how linearizer means 28 accomplishes its purpose, it is first necessary to describe the operation of a reoccurring portion of the circuit of linearizer means 28. The portion encompassed by reference line 29 is an example of the repetitive circuit. Amplifier $A_1$, as well as amplifiers $A_2$ and $A_3$, is an analog operational amplifier. An analog operational amplifier operates to subtract a reference input voltage from a second input voltage to obtain a voltage difference, to change the sign of the difference, and to apply this sign changed voltage difference to the second input voltage so as to cause it to have the same sign and magnitude as the reference input voltage. If the reference input is grounded, then the amplifier reduces the second input voltage to zero. For example, in the circuit encompassed by reference line 29, since input 70 is grounded by conductor 72, amplifier $A_1$ attempts to cause the voltage at juncture 74 to equal zero. Since $A_1$ draws no current through conductor 76, all the current flowing from point 78 to point 80 must flow through $R_1$ and $R_2$ in series. This fact coupled with the fact that the voltage at juncture 74 is zero, permits the following equation to be written:

$$E_2/R_1 = E_a/R_2$$

With the knowledge acquired from the above discussion many equations may be written for the linearizer 28. Before writing these equations it should be first explained that $Z_1$ and $Z_2$ are nonlinear resistors whose currents vary with a constant power of the applied voltage. For example, triodes whose plate currents vary with a constant power of plate voltage for a fixed grid voltage, may be used as non-linear resistors $Z_1$ and $Z_2$. This type of non-linear resistor may be used in the input path of an operational amplifier to produce an output voltage that is equal to a constant times the voltage drop across the variable resistor raised to some power.

The following equations may be written for the linearizer 28:

$$E_b = \frac{R_6 E_d}{R_5 + R_6}, \; E_d = \frac{R_3 E_a}{Z_2}, \; E_a = \frac{R_2 E_2}{R_1}$$

combining $$E_b = \frac{R_6 R_3 R_2 E_2}{(R_5 + R_6) Z_2 R_1}$$

The circuit of linearizer 26 performs the following algebraic function (circuit equation):

$$-E_0 = \frac{E_a R_4}{Z_1} + \frac{E_b R_4}{R_7} + \frac{E_r R_4}{R_8} \text{ or}$$

$$= \frac{R_2 E_2 R_4}{R_1 Z_1} - \frac{R_6 R_3 R_2 R_4 E_2}{(R_5 + R_6) Z_2 R_1 R_7} + \frac{E_r R_4}{R_8}$$

The first step in adjusting the linearizer 26 is to adjust $Z_1$ so that with the other circuits disconnected, $$E_0 = K_1 E_a^4$$

where $K_1$ is a constant. Since $E_0/E_a = R_4/Z_1$, then $$Z_1 = \frac{R_4 E_a}{E_0} = \frac{R_4 E_a}{K_1 E_a^4} = \frac{R_4}{K_1 E_a^3}$$

The second step is to adjust $Z_2$ with $R_6/(R_5+R_6)=1$ such that with the other circuits disconnected $E_0 = K_2 E_a^2$, where $K_2$ is a constant. Since $$E_0 = \frac{R_4}{R_7} E_b = \frac{R_1 R_3}{R_1 Z_2} E_a$$

then $$Z_2 = \frac{R_4 R_3}{R_7 K_2 E_a}$$

Substituting the above expressions for $Z_1$ and $Z_2$ into the circuit equation yields:

$$-E_0 = \frac{R_2}{R_1} E_2 K_1 \frac{(R_2)^3}{(R_1)^3} E_2^3 - \frac{R_6 R_2 E_2 K_2 R_2 E_2}{(R_5+R_6) R_1 R_1} + E_r \frac{R_4}{R_8}$$

$$= K_1 \frac{(R_2)^4}{(R_1)^4} E_2^4 - \frac{R_6}{(R_5+R_6)} (R_2/R_1)^2 E_2^2 + E_r \frac{R_4}{R_8}$$

To simplify these equations $(R_2/R_1) E_2$ is replaced by $E_a$ to yield:

$$-E_0 = K_1 E_a^4 - \frac{R_6 K_2 E_a^2}{(R_5+R_6)} + \frac{E_r R_4}{R_8}$$

or $$\frac{E_0}{K_1} = E_a^4 - \frac{R_6 K_2 E_a^2}{(R_5+R_6)K_1} + \frac{E_r R_4}{K_1 R_8}$$

It should be recalled that the desired output function is given by:

$$B^2 V = E_2^4 - 2AE_2^2 + A^2$$

In order for the right hand sides of the last two equations to be equal, the following expressions must exist:

$$2A = \frac{R_6 K_2}{(R_5+R_6)K_1} \text{ and } A^2 = \frac{E_r R_4}{K_1 R_8}$$

Combining these two equations to eliminate A yields:

$$\frac{R_6^2}{(R_5+R_6)^2} = 4E_r \frac{R_4 K_1}{R_8 K_2}$$

The value of the term $R^2_6/(R_5+R_6)^2$ may be made to equal the right positioned term of the last equation by adjusting potentiometer 82. When this adjustment is made, the circuit equation takes the following desired form:

$$E_0/K_1 = E_a^4 - 2AE_a^2 + A^2$$

The only remaining adjustment to be made is an adjustment which will make output voltage $E_0$ equal to zero when fluid velocity V is equal to zero or in other words the following equation must hold:

$$0 = E_a^4 - 2AE_a^2 + A^2$$

There are two values of $E_a$ which will satisfy this equation. Since $E_a = E_2 R_2/R_1$, the ratio $R_2/R_1$ may be adjusted to obtain a value of $E_a$ which will satisfy the last equation. This last adjustment completes the adjustment of linearizer 26.

Figure 2:
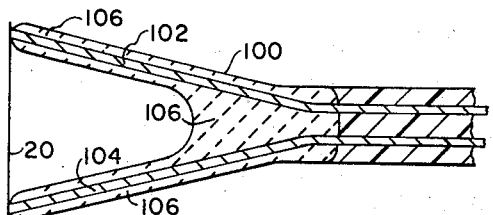
FIG. 2 is a cross-sectional view of the probe.

FIG. 2 is a cross-sectional view of probe 100. Probe 100 comprises probe resistor 20 and leads 102 and 104. Leads 102 and 104 are part of path 34 and have cross-sectional areas that are substantially larger than the cross-sectional area of resistor probe 20. Because of this cross-sectional area difference, the electrical resistance of path 34 between junctures 38 and 50 is substantially equal to the resistance of probe resistor 20.

Probe resistor 20 and leads 102 and 104 are made of the same noble metal (e.g. platinum). Probe resistor 20 is spotwelded at one end to the end of lead 102 and at the other end to the end of lead 104. Electrochemical reactions between probe resistor 20 and leads 102 and 104 will not occur since they are spotwelded together and are made of the same material.

Leads 102 and 104 are insulated from the fluid by insulator material 106 over portions of the leads except in the vicinity of spotwelds. Insulator material 106 is needed to prevent electrical shunting between leads 102 and 104.

Figure 3:
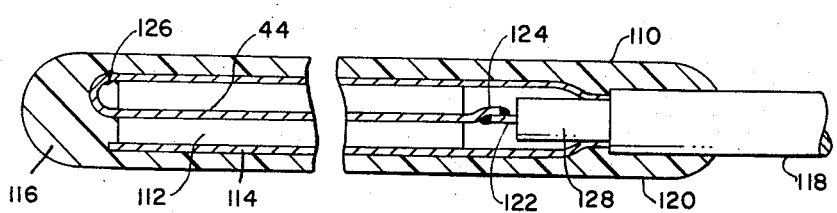
FIG. 3 is a cross-sectional view of the reference resistor.

FIG. 3 shows a cross-sectional view of reference probe 110 which comprises concentrically arranged reference resistor 44, insulator 112, shield-return line 114, and fluid impervious insulation 116. Co-axial cable 118 enters end 120 of reference probe 110. Center conductor 122 of co-axial cable 118 is soldered to one end of reference resistor 44 at 124. The other end of reference resistor 44 is soldered to one end of shield-return line 114 at 126. Shield-return line 114 is also attached to outer conductor 128 of co-axial cable 118. Shield-return line 114 acts to shield reference resistor 44 from electromagnetic radiation. Reference resistor 44, shield-return line, center conductor 122 and outer conductor 128 are all part of reference path 36.

The cross-sectional areas of center conductor 122, shield-return line 114 and outer conductor 128 are each substantially greater than the cross-sectional area of reference resistor 44. This area difference makes the electrical resistance of path 36 between juncture 38 and 48 to be substantially equal to the resistance of reference resistor 44.

While the forms of embodiment herein shown and described constitute preferred forms, it is understood that other forms may be adopted falling within the scope of the claims that follow.

I claim:
1. A fluid anemometer system comprising in combination:
(A) a Wheatstone bridge comprising:
  (1) a conductor forming a probe path including:
    (a) a probe resistor immersed in a fluid, said probe resistor comprising:
      (i) a substantially straight, elongated resistor wire,
      (ii) lead wires, each of said lead wires having a conductivity that is substantially greater than the conductivity of the probe resistor wire, the ends of said resistor wire being electrically spot welded to ends of both lead wires whereby said resistor wire is in series circuit relationship with the lead wires,
      (iii) electrical insulation between the lead wires and the fluid except where said wires are spot welded to the resistor wire;
    (b) and an incremental resistor connected in series circuit relationship with the probe resistor and having a temperature coefficient of resistivity which is substantially lower than that of the probe resistor;
  (2) a second conductor forming a reference path which has an electrical resistance that is substantially higher than that of the conductor forming the probe path, said reference path including:
    (a) a reference resistor immersed in said fluid, said reference resistor having substantially the same temperature coefficient of resistivity as that of said probe resistor,
    (b) a variable resistor connected in series circuit relationship with the reference resistor and having a temperature coefficient of resistivity which is substantially lower than that of said probe resistor;
  (3) primary junctures for connecting said first and second mentioned conductors in parallel circuit relationship;
  (4) a secondary juncture between the probe resistor and the incremental resistor;
  (5) a secondary juncture between the reference reisistor and the variable resistor, the magnitude of the resistance of said resistors being such that the magnitude of the resistance of the variable resistor or the probe resistor may be varied so as to reduce the voltage potential between the secondary junctures to zero when a voltage is applied to the primary junctures;
  (6) a conductor connected to the first mentioned secondary juncture;
  (7) a conductor connected to the second mentioned secondary juncture;
  (8) a conductor connected to one of the primary junctures;
  (9) a conductor connected to the other of the primary junctures, said last mentioned conductor being connected to an electrical ground;
(B) an amplifier whose input side is connected with the third and fourth mentioned conductors such that the input voltage to said amplifier is equal to the voltage potential between the third and fourth mentioned conductors, the output side of said amplifier being connected to the fifth mentioned conductor, the gain of said amplifier being variable and having a maximum limit which is substantially greater than zero, said amplifier having an output conductor;
(C) means forming a source of voltage potential, said means being electrically connected to the input side of said amplifier;

(D) means for varying the magnitude of the voltage from said source;

(E) and a linearizer connected with said output conductor of the amplifier, the output voltage of said linearizer being a linear function of the velocity of said fluid relative to said probe resistor.

2. A fluid anemometer system as defined in claim 1 in which the resistor wire (A)(1)(a)(i) and the lead wires (A)(1)(a)(ii) are made of the same material.

3. A fluid anemometer system as defined in claim 1 in which the linearizer includes adjusting means which can reduce the output voltage of the linearizer to zero when said probe resistor and reference resistor are immersed in proximity to one another in a fluid having zero velocity.

4. A fluid anemometer system comprising in combination:
- (A) a Wheatstone bridge comprising:
  - (1) a conductor forming a probe path including:
    - (a) a probe resistor immersed in a fluid,
    - (b) and an incremental resistor connected in series circuit relationship with the probe resistor and having a temperature coefficient of resistivity which is substantially lower than that of the probe resistor;
  - (2) a second conductor forming a reference path which has an electrical resistance that is substantially higher than that of the conductor forming the probe path, said reference path including:
    - (a) a reference probe including the following concentrically arranged elements:
      - (i) an innermost element comprising a reference resistor, said reference resistor having substantially the same temperature coefficient of resistivity as that of the probe resistor;
      - (ii) an electrical insulator substantially encompassing said reference resistor;
      - (iii) an electrical conductor substantially encompassing said electrical insulator, and having conductivity which is substantially greater than the conductivity of said reference resistor;
      - (iv) an electrical insulator substantially encompassing said mentioned conductor (A)(2)(iii) and being composed of a material which is impervious to fluid, said last mentioned insulator prohibiting the fluid from contacting the other elements;
    - (b) lead wires, each of said lead wires having a conductivity that is substantially greater than the conductivity of the reference resistor, said reference resistor being in series circuit relationship and being a part of the second mentioned circuit;
    - (c) connecting means for electrically connecting one end of the reference resistor to one end of the second mentioned conductor (A)(2);
    - (d) connection means for electrically connecting the other end of said reference resistor to an end of a lead wire;
    - (e) connecting means for electrically connecting the other lead wire to the opposite end of the second mentioned conductor;
    - (f) a variable resistor connected in series circuit relationship with the reference resistor and having a temperature coefficient to resistivity which is substantially lower than that of said probe resistor;
  - (3) primary junctures for connecting said first and second mentioned conductors in parallel circuit relationship;
  - (4) a secondary juncture between the probe resistor and the incremental resistor;
  - (5) a secondary juncture between the reference resistor and the variable resistor, the magnitude of resistance of said resistors being such that the magnitude of the resistance of the variable resistor or the probe resistor may be varied so as to reduce the voltage potential between the secondary junctures to zero when a voltage is applied to the primary junctures;
  - (6) a conductor connected to the first mentioned secondary juncture;
  - (7) a conductor connected to the second mentioned secondary juncture;
  - (8) a conductor connected to one of the primary junctures;
  - (9) a conductor connected to the other of the primary junctures, said last mentioned conductor being connected to an electrical ground;
- (B) means forming a source of voltage potential, said means being electrically connected to the input side of said amplifier;
- (C) means for varying the magnitude of the voltage from said source;
- (D) and a linearizer connected with said output conductor of the amplifier, the output voltage of said linearizer being a linear function of the velocity of said fluid relative to said probe resistor.

5. A fluid anemometer system comprising in combination:
- (A) a Wheatstone bridge comprising:
  - (1) a conductor forming a probe path including;
    - (a) a probe resistor immersed in a fluid,
    - (b) and an incremental resistor connected in series circuit relationship with the probe resistor and having a temperature coefficient of resistivity which is substantially lower than that of the probe resistor;
  - (2) a second conductor forming a reference path which has an electrical resistance that is substantially higher than that of the conductor forming the probe path, said reference path including:
    - (a) a reference resistor immersed in said fluid, said reference resistor having substantially the same temperature coefficient of resistivity as that of said probe resistor,
    - (b) a variable resistor connected in series circuit relationship with the reference resistor and having a temperature coefficient of resistivity which is substantially lower than that of said probe resistor;
  - (3) primary junctures for connecting said first and second mentioned conductors in parallel circuit relationship;
  - (4) a secondary juncture between the probe resistor and the incremental resistor;
  - (5) a secondary juncture between the reference resistor and the variable resistor, the magnitude of the resistance of said resistors being such that the magnitude of the resistance of the variable resistor or the probe resistor may be varied so as to reduce the voltage potential between the secondary junctures to zero when a voltage is applied to the primary junctures;
  - (6) a conductor connected to the first mentioned secondary juncture;
  - (7) a conductor connected to the second mentioned secondary juncture;
  - (8) a conductor connected to one of the primary junctures;
  - (9) a conductor connected to the other of the primary junctures, said last mentioned conductor being connected to an electrical ground;
- (B) an amplifier whose input side is connected with the third and fourth mentioned conductors such that the input voltage to said amplifier is equal to the voltage potential between the third and fourth mentioned conductors, the output side of said amplifier being connected to the fifth mentioned conductor, the gain of said amplifier being variable and having a maximum limit which is substantially greater than zero, said amplifier having an output conductor;

(C) means forming a source of voltage potential, said means being electrically connected to the input side of said amplifier;

(D) means for varying the magnitude of the voltage from said source;

(E) and a linearizer connected with said output conductor of the amplifier, the output voltage of said linearizer being a linear function of the velocity of said fluid relative to said probe resistor, said linearizer including:

(1) adjustable means for reducing the output voltage of the linearizer to zero when said probe resistor and reference resistor are immersed in the proximity to one another in a fluid having zero velocity.

References Cited

UNITED STATES PATENTS

| | | | |
|---|---|---|---|
| 2,650,496 | 9/1953 | Middleton et al. | 73—362 X |
| 2,726,546 | 12/1955 | King | 73—204 |
| 3,052,124 | 9/1962 | Averitt | 73—362 |
| 3,220,255 | 11/1965 | Scranton et al. | 73—204 |

OTHER REFERENCES

"Design of a Hot-Wire Anemometer" by Pearson, Electronics, October 1954; pp. 8 and 9.

Article by Hussenot et al. from Academie des Sciences, Mar. 19, 1962; pp. 2114–2146.

RICHARD C. QUEISSER, *Primary Examiner.*

JAMES J. GILL, *Examiner.*

EDWARD D. GILHOOLY, *Assistant Examiner.*